No. 674,219. Patented May 14, 1901.
J. A. SCHARWATH.
FABRIC.
(Application filed Feb. 2, 1901.)
(No Model.)
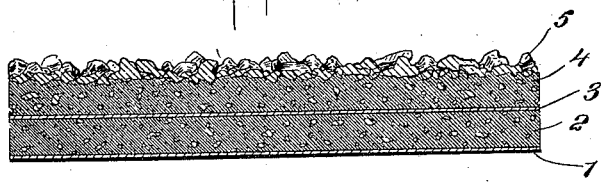
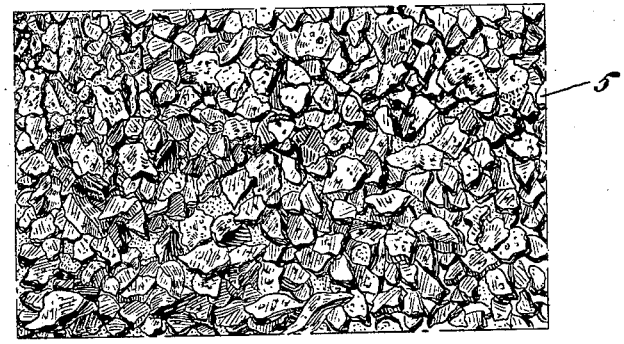
WITNESSES:
INVENTOR
John A. Scharwath
BY
ATTORNEYS
THE NORRIS PETERS CO., PHOTO-LITHO., WASHINGTON, D. C.

UNITED STATES PATENT OFFICE.

JOHN A. SCHARWATH, OF JERSEY CITY, NEW JERSEY.

FABRIC.

SPECIFICATION forming part of Letters Patent No. 674,219, dated May 14, 1901.

Application filed February 2, 1901. Serial No. 45,719. (No specimens.)

*To all whom it may concern:*

Be it known that I, JOHN A. SCHARWATH, a citizen of the United States, and a resident of Jersey City, in the county of Hudson and State of New Jersey, have invented a new and Improved Fabric, of which the following is a full, clear, and exact description.

This invention relates to improvements in fabrics, particularly for use as a roofing material or siding for buildings; and the object is to provide a fabric that shall be waterproof, flexible, light, and strong and of a material not subject to change by changes in temperature.

I will describe a fabric embodying my invention and then point out the novel features in the appended claims.

Reference is to be had to the accompanying drawings, forming a part of this specification, in which similar characters of reference indicate corresponding parts in both figures.

Figure 1 is a sectional view of a fabric embodying my invention, and Fig. 2 is a plan view thereof.

The fabric comprises in its construction a layer or base 1, of non-porous waterproof material, such as paper properly treated or a woven fabric properly treated to render it waterproof. On this base 1 is a layer 2, of mastic material, consisting of wax-tailings (also known as "still-wax") combined with a suitable oxid—such, for instance, as oxid of iron and granulated cork or cork-flour. The proportions usually employed are seventy per cent. of the wax-tailings to fifteen per cent. of oxid and fifteen per cent. of cork particles; but it is to be understood that the proportions may be varied without departing from the spirit of my invention. Upon this layer 2 is a waterproof material 3, similar to the base 1, and upon this waterproof material is a layer 4 of mastic, similar to that in layer 2, and these alternating layers of material may be carried out to any desired number, and the whole may be finished by a top layer of coarse granulated cork 5 or similar material or with fine stone.

The mastic material formed as stated is very light and elastic, and as there is no sand, gravel, or similar material mixed with it it will not become hard and liable to crack or break.

Having thus described my invention, I claim as new and desire to secure by Letters Patent—

1. A fabric, comprising a base of waterproof material, and a mastic material on the base, consisting of wax-tailings, a metal oxid and fine cork, substantially in the proportions specified.

2. A fabric, comprising a layer or sheet of waterproof material, a layer of mastic consisting of wax, an oxid and a binding material, another layer of waterproof material placed upon said mastic, another layer of mastic placed upon the last-named waterproof material, and cork particles placed upon the last-named layer of mastic, substantially as specified.

In testimony whereof I have signed my name to this specification in the presence of two subscribing witnesses.

JOHN A. SCHARWATH.

Witnesses:
EVERARD BOLTON MARSHALL,
C. R. FERGUSON.